United States Patent Office 2,747,742
Patented May 29, 1956

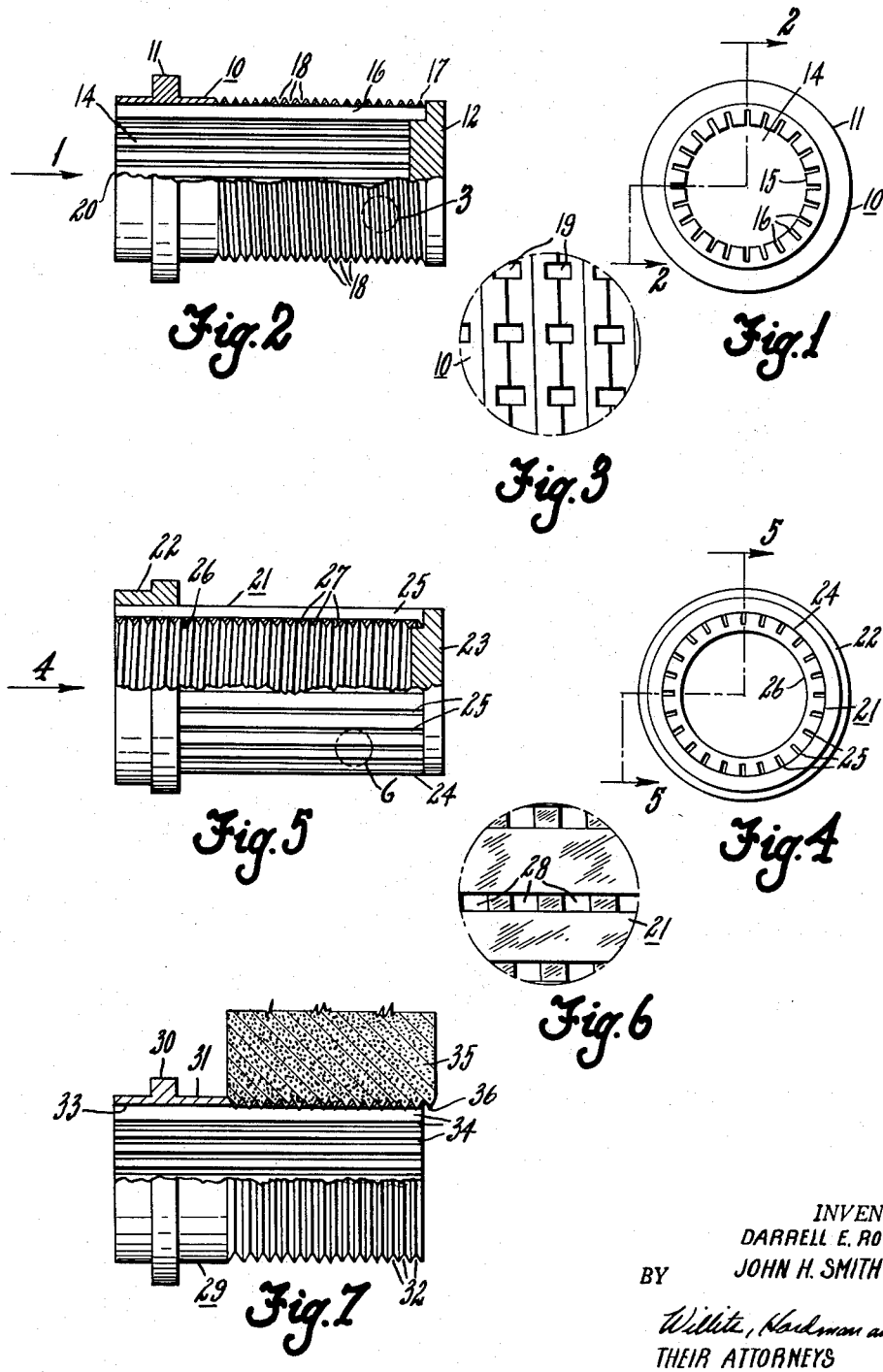

2,747,742

FILTER AND METHOD OF MAKING SAME

Darrell E. Royer, Vandalia, and John H. Smith, Dayton, Ohio, assignors to General Motors Corporation, Detroit, Mich., a corporation of Delaware Application May 31, 1952, Serial No. 291,032

2 Claims. (Cl. 210—169)

The present invention relates to filters and more particularly to filters particularly adapted for utilization in aircraft hydraulic systems.

In hydraulic systems for actuating precision aircraft equipment, the necessity of adequately filtering is readily apparent. However, in the design of filters certain criteria must be considered. Of utmost importance is the efficiency of the filter. Naturally, perfect filtering is to be desired, but as is generally the case, some sacrifices must be made in this respect due to other considerations, such as the flow restriction caused by the filter and the rapidity by which the filter is subjected to clogging sufficient to necessitate cleaning or replacement. Moreover, in designing filters for aircraft hydraulic systems, such as propeller pitch adjusting mechanisms, the size and rigidity of the filter element are also of primary importance. In hydraulic systems of this character, high flow rates are required and the pressure drop across the filter element must be held at a minimum. Accordingly, among our objects are the provision of an efficient filter element of small and rigid construction, and the further provision of the method for making such a filter element.

The aforementioned and other objects are accomplished in the present invention by providing a metallic filter element with a plurality of small substantially uniform openings. Specifically, the filter element includes a tubular member which is closed at one end. A plurality of minute openings are formed in the circumferential walls of the tubular member, the openings being in sets which extend circumferentially and longitudinally of the tubular member. The openings are formed by the intersection of substantially straight grooves, formed on one circumferential surface of the tubular member, and substantially annular grooves formed on the other circumferential surface of the tubular member. Due to the configuration of the grooves formed on the internal and external circumferential surfaces of the tubular member, the openings or holes formed at the intersections thereof are substantially rectangular in shape. Several modified constructions are disclosed herein, the preferred embodiment having annular rings on the external circumferential surface and substantially straight flutes formed on the internal circumferential surface of the tubular member.

The method of making the preferred construction comprehends the following steps: shaping the tubular member to the desired size and external configuration; reaming the internal surface so as to produce a smooth, round bore; forming substantially straight flutes, or grooves, on the internal circumferential surface; forming substantially annular rings on the external circumferential surface during which the openings are formed in the tubular member; deburring the tubular member to obtain openings of substantially uniform size and, thereafter, installing an end cap to close one end of the tubular member.

Further objects and advantages of the present invention will be apparent from the following description, reference being had to the accompanying drawing wherein preferred embodiments of the present invention are clearly shown.

In the drawing:

Fig. 1 is an end view of one form of filter element taken in the direction of arrow 1 in Fig. 2.

Fig. 2 is a view partly in elevation and partly in section taken along line 2—2 of Fig. 1.

Fig. 3 is an enlarged view taken in the area 3 of Fig. 2, showing the configuration of the openings.

Fig. 4 is an end view of another form of filter element taken in the direction of arrow 4 in Fig. 5.

Fig. 5 is a view partly in elevation and partly in section taken along line 5—5 of Fig. 4.

Fig. 6 is an enlarged view taken in the area 6 of Fig. 5, showing the configuration of the openings.

Fig. 7 is a view partly in section and partly in elevation showing the preferred form of filter element and illustrating one step in the method of making the same.

Referring more particularly to Figs. 1 to 3, a filter element is shown comprising a tubular member 10 having formed adjacent one extremity thereof an upstanding annular shoulder 11. The other extremity of the tubular member 10 is closed by a cap member 12, which is bonded thereto to prevent fluid flow through the bore 14 of the tubular member by any suitable means, such as silver soldering or copper brazing. As is seen more particularly in Fig. 1, the internal circumferential surface 15 of the tubular member 10 is provided with a plurality of substantially straight longitudinal extending grooves or flutes 16. The flutes or grooves 16 are radial and are spaced equal arcuate distances apart throughout the inner circumferential surface 15. The grooves 16 are preferably of a depth between one-half and three-fourths the thickness of the tubular member 10. Referring particularly to Fig. 2, the external circumferential surface 17 of the tubular member is provided with a plurality of annular grooves 18, which in Fig. 2 are formed as a thread having a small pitch or lead. The depth of the substantially annular grooves 18 is, likewise, preferably between one-half and three-fourths the wall thickness of the tubular member 10. At the intersection of the grooves 18 and the grooves 16, a plurality of small openings 19 of substantially rectangular configuration are formed, as is shown in Fig. 3. Depending on the configuration of the grooves 16 and 18, the configuration of the openings 19 may be varied. The shoulder 11 is used in mounting the filter element in a hydraulic system. The flow of fluid may be in either direction through the open end 20 of the tubular member 10 and the holes 19 in the circumferential wall thereof.

The instant filter element was developed primarily for adaptation in aircraft hydraulic systems having substantial flow rates. For example, in propeller pitch adjusting hydraulic systems, flow rates varying between 400 and 800 cubic inches per minute must be provided with a maximum pressure drop of from 20 to 30 p. s. i. across the filter element. Moreover, due to the number of hydraulic fluid lines which require filtering, only a limited area is available for mounting the filter elements. Accordingly, the filter elements of necessity had to be very small. The area of each of the openings in the circumferential wall of the filter element may be varied depending on the size of the grooves formed in the inner and outer circumferential surfaces thereof. The particular size of opening used, is determined by the efficiency of filtering required within the limitations prescribed by the flow rates and pressure drops that are permissible.

Referring to Figs. 4, 5 and 6, a second form of filter element is shown. The second form of filter element includes a filter member 21 having suitably attached thereto at one end a supporting member 22. The other end of the tubular member 21 is closed by an end cap 23. In this form of the filter element, the external circumferential surface 24 of the tubular member is provided with a plurality of radially extending grooves 25, similar in character to the grooves 16 described in connection with Fig. 1. The internal circumferential surface 26 of the tubular member is provided with a plurality of substantially annular grooves 27, which take the form of a screw thread, similar to the grooves 18 described in connection with Fig. 2. A plurality of holes or openings 28 are likewise formed by the intersection of the grooves in the internal and external circumferential surfaces of the tubular member, as is shown in Fig. 6. The second form of filter element is also adapted to filter liquid flow in either direction through the openings 28.

With reference to Fig. 7, the preferred form of filter element includes a tubular member 29, which has formed intergral therewith an annular projecting shoulder 30. The external circumferential surface 31 of the tubular member 29 is provided with a plurality of annular grooves 32, which have no lead or pitch. The internal circumferential surface 33 of the tubular member 29 is provided with a plurality of radial grooves 34 which extend substantially longitudinally of the tubular member 29, similar to the grooves 16 described in connection with Fig. 1. A plurality of openings, not shown, are likewise formed by the intersection of the internal and external grooves formed on the tubular member 29. In each of the several modifications, the openings or holes in the tubular member may be characterized as extending in circumferential sets or as arcuately displaced sets or rows of openings extending lengthwise of the filter elements.

The filter elements are preferably made from free machining steel or brass. The general method of making the filter elements includes the preliminary steps of shaping the external surface of the tubular members to the desired configuration and reaming a smooth bore therethrough. After these preliminary steps, the grooves on the internal circumferential surface are formed. In the form shown in Figs. 1 to 3, the internal grooves 16 are formed as flutes by a broaching operation. In the form disclosed in Figs. 4 to 6, the internal grooves 27 are formed by a threading operation. Following this step, the external circumferential surface of the tubular members is grooved. With reference to the form disclosed in Figs. 1 to 3, the grooves 18 are formed by a threading operation. With reference to the form disclosed in Figs. 4 to 6, the grooves 25 are formed by a broaching operation. Following the grooving steps, the element is deburred to insure that the openings formed by the grooving operations will be of substantially uniform size. Deburring may be accomplished by such means as a vapor blast or an acid etching operation. The final step comprehends the bonding of the end caps to close one end of the tubular members, and in the form shown in Figs. 4 to 6, the supporting member 22 would likewise be affixed to the tubular member 21.

The preferred method of making the preferred form, illustrated in Fig. 7, comprehends the preliminary steps aforedescribed of shapping the tubular member and reaming the bore thereof. The next step is to broach the inner circumferential surface 33 of the tubular member 29 to form the grooves 34. The following step is the formation of the annular grooves 32 in the external circumferential surface 31 in the tubular member. This is accomplished by a crush grinding operation, which is partially illustrated in Fig. 7. In the crush grinding operation, a grinding wheel 35 having an edge surface formed with a plurality of cutting ridges 36 is brought into contact with the external surface 31 of the tubular member 29, while the tubular member 29 is suitably supported and rotated about its axis. The annular grooves or rings 32 are formed in this manner. Thereafter, the filter element is deburred by any suitable process, such as the previously referred to operation. The final step comprehends the installation of an end cap which sealingly engages and closes off one end of the tubular member 29 in a similar manner to the end caps shown in Figs. 2 and 5. This filter element may likewise be used to filter flow in either direction.

It is apparent from the aforegoing description that the present invention provides a unique filter element of small and rigid construction. By practicing the teachings of the present invention, any desired filtering efficiency may be obtained as the area of the holes formed by the grooving operations may be accurately controlled. Moreover, the filtering elements may be easily cleaned, should they become clogged during use, by means of an air blast.

While the embodiments of the present invention as herein disclosed, constitute preferred forms, it is to be understood that other forms might be adopted.

What is claimed is as follows:

1. An aircraft hydraulic control system filter of small area for fluid line mounting comprising, a thin tubular member having an integral annular mounting shoulder at one end and a separate sealing cap bonded to the opposite end thereof, a plurality of longitudinal flutes of rectangular cross section broached radially to a depth of between one-half and three-fourths into one circumferential surface of said tubular member, a transverse, continuous, thread-like spiral portion with a spiral V-shaped groove formed in the other circumferential surface, said spiral groove having a depth intersecting said flutes to form a plurality of accurate, uniformly-sized, filtering apertures in said thin tubular member, said continuous spiral portion serving to retain rigidity of said thin tubular member both during the aperture forming and during efficient high pressure fluid filtering in said aircraft hydraulic system.

2. In a method for making an aircraft hydraulic system filter of small area for fluid line mounting, the steps comprising, shaping a small tubular member with a smoothly reamed bore therethrough, fluting said bore surface to a depth between one-half and three-fourths of the thickness of said tubular member by a broaching operation, forming a continuous, spiral, annular, external, circumferential portion with a continuously progressing groove intersecting said internal grooves on said tubular member and causing formation of a plurality of accurate and uniformly-sized strainer apertures depending in size upon the depth of external cutting, and finishing up said tubular member by deburring and installing a sealing end cap at one end of said tubular member.

References Cited in the file of this patent

UNITED STATES PATENTS

| | | |
|---|---|---|
| 633,368 | Riddick | Sept. 19, 1899 |
| 815,290 | Greer | Mar. 13, 1906 |
| 1,208,342 | Loftus | Dec. 12, 1916 |
| 1,867,137 | Carver | July 12, 1932 |
| 1,922,315 | Mooz | Aug. 15, 1933 |
| 2,271,662 | Rubissow | Feb. 3, 1942 |

FOREIGN PATENTS

| | | |
|---|---|---|
| 4,286 | Great Britain | of 1883 |
| 505,553 | Great Britain | May 12, 1939 |
| 874,424 | France | Aug. 6, 1942 |